United States Patent [19]

Kerby

[11] 4,170,558

[45] Oct. 9, 1979

[54] CENTRIFUGAL LIQUID CLEANER

[76] Inventor: Lawrence L. Kerby, 1604 Van Horne La., Redondo Beach, Calif. 90278

[21] Appl. No.: 859,387

[22] Filed: Dec. 12, 1977

[51] Int. Cl.² ............................................. B01D 21/26
[52] U.S. Cl. ..................................... 210/232; 210/305; 210/307; 210/319; 210/294
[58] Field of Search ...................... 210/84, 532 R, 173, 210/174, 232, 305, 307, 294, 319; 55/406; 233/1, 2, 7

[56] References Cited

U.S. PATENT DOCUMENTS

| | | | |
|---|---|---|---|
| 1,400,622 | 12/1921 | Nordell | 210/84 |
| 2,383,302 | 8/1945 | Feinauer et al. | 210/532 R X |
| 2,770,362 | 11/1956 | Paquin | 210/532 R X |
| 3,865,022 | 2/1975 | Ahlrich | 55/406 X |

Primary Examiner—Frank A. Spear, Jr.
Attorney, Agent, or Firm—John Holtrichter, Jr.

[57] ABSTRACT

A liquid cleaner incorporating a driven impeller rotatably mounted in a perforated cage whereby liquid to be purified is introduced into the cage adjacent the center thereof, the impurities suspended in the liquid tending, by the centrifugal action of the impeller acting on the liquid in the cage, to move outwardly through apertures in the circular side wall of the cage, and downwardly into a lower sedimentation trap area outside the influence of the centrifugal action, the purified liquid then leaving the cage area through a suitable orifice at a predetermined distance from the axis of the cage.

9 Claims, 6 Drawing Figures

CENTRIFUGAL LIQUID CLEANER

BACKGROUND OF THE INVENTION

The background of the invention will be set forth in two parts.

1. Field of the Invention

This invention relates to a liquid cleaner, and more particularly, to such cleaner mechanisms utilizing centrifugal force to separate particulate matter from the fluid host.

2. Description of the Prior Art

Under relatively low flow rate conditions, a conventional filter cartridge type filter system has proven to be adequate where a high degree of filtration is not required and where the amount of contamination is relatively low. However, higher flow rates and higher concentrations of contaminants quickly clog a conventional cartridge filter and also generally introduce an undesired amount of flow restriction into the system.

Over the years, several techniques have been developed which take advantage of a centrifuge type mechanism in order to increase the filter effectiveness and lessen the flow restriction aspects of cartridge filter systems. A typical one of such prior art systems includes a rotating centrifuge cage having a cartridge filter element fixedly disposed therein. The filter cartridge rotates with the cage and tends to trap particulate matter therein, while the purified liquid is drawn off at the top of the cage through appropriate openings adjacent the periphery of the cage.

Since the cartridge element must rotate at the same rate as the centrifuge cage, it must be constructed to withstand the forces exherted on it, and must be replaced relatively frequently since the capacity of such a configuration is extremely limited.

In accordance with another filter scheme, liquid to be filtered passes through a rotating screen. In order to remove contaminants from the screen which would otherwise eventually block the liquid flow therethrough, a small percentage of the filtered liquid is caused to reverse its flow direction and move back through the screen to remove contaminants therefrom and cause them to flow to a sump. Although using a centrifugal principal, filter efficiency is relatively low as compared to the previously described system.

These and other prior art mechanisms may be reviewed in the following patents discovered in a Patent and Trademark Office search:

U.S. Pat. No. 2,129,751 — A. A. Wells et al.
U.S. Pat. No. 2,733,855 — M. M. McCoy
U.S. Pat. No. 2,750,107 — D. More
U.S. Pat. No. 2,792,172 — W. H. Tait
U.S. Pat. No. 3,400,827 — F. A. Ziherl
U.S. Pat. No. 3,599,792 — P. W. Stripp
U.S. Pat. No. 3,633,754 — D. C. Marsh
U.S. Pat. No. 3,858,793 — D. J. Dundrey

SUMMARY OF THE INVENTION

In view of the foregoing factors and conditions, characteristic of the prior art, it is a primary object of the present invention to provide a new and improved centrifugal cleaner.

Another object of the present invention is to provide a relatively simple to construct, yet effective and highly efficient centrifugal cleaner.

Still another object of the present invention is to provide a centrifugal cleaner utilizing an impeller rotating within a perforated stationary cage which presents relatively little liquid flow resistance.

Yet another objective of the present invention is to provide a centrifugal cleaner incorporating a stationary sedimentation assembly below a centrifuge mechanism where particulate and other contaminants may settle outside the influence of the centifugal forces.

In accordance with an embodiment of the present invention, a centrifugal cleaner is provided for removing contaminating matter from a fluid host. The cleaner includes a housing having inlet and outlet openings therein and having an elongated shaft rotatably mounted and extending through a wall thereof. A portion of the shaft which extends outside the housing includes coupling means for coupling the shaft to a source of rotational power. An impeller is mounted within the housing and is fixedly attached to that portion of the shaft extending within the housing. The impeller has a plurality of radially projecting blades extending an equal distance from the axis of rotation of the shaft. A cage enclosing the impeller is fixedly mounted within the housing and has a cylindrical side wall coaxial with the axis of rotation and dimensions such that its inner wall surface is immediately adjacent but not in contact with the outer peripheral edges of the blades. The cylindrical side wall is spaced from the inner wall of the housing and includes a plurality of spaced apertures therethrough. The cage also includes spaced transverse walls generally perpendicular to the axis of the cylindrical side wall and have respective inner surfaces immediately adjacent to the side edges of the blades. The cage further includes inlet and outlet passages respectively providing fluid communication between the inlet and outlet openings in the housing and the interior of the cage. The invention also includes a stationary sedimentation element disposed below the cage and within the housing and in the path of particulate matter, for example, passing through the apertures in the cylindrical cage.

The features of the present invention which are believed to be novel are set forth with particularity in the appended claims. The present invention, both as to its organization and manner of operation, together with further objects and advantages thereof may best be understood by making reference to the following description taken in conjunction with the accompanying drawings in which like reference characters refer to like elements in the several views.

DESCRIPTION OF THE EMBODIMENTS

Figure 1:
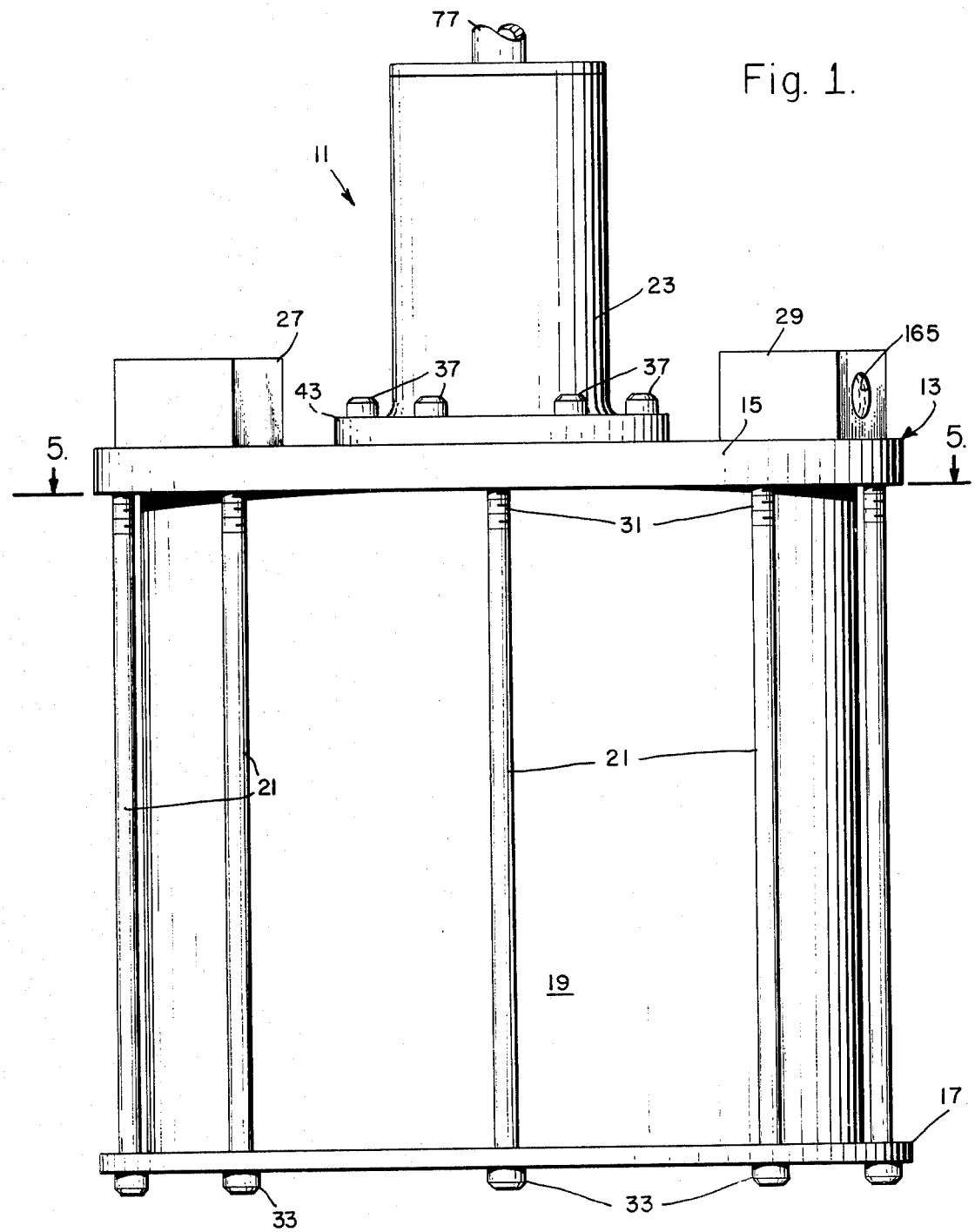
FIG. 1 is a front elevational view of a centrifugal cleaner according to an embodiment of the present invention.
Figure 2:
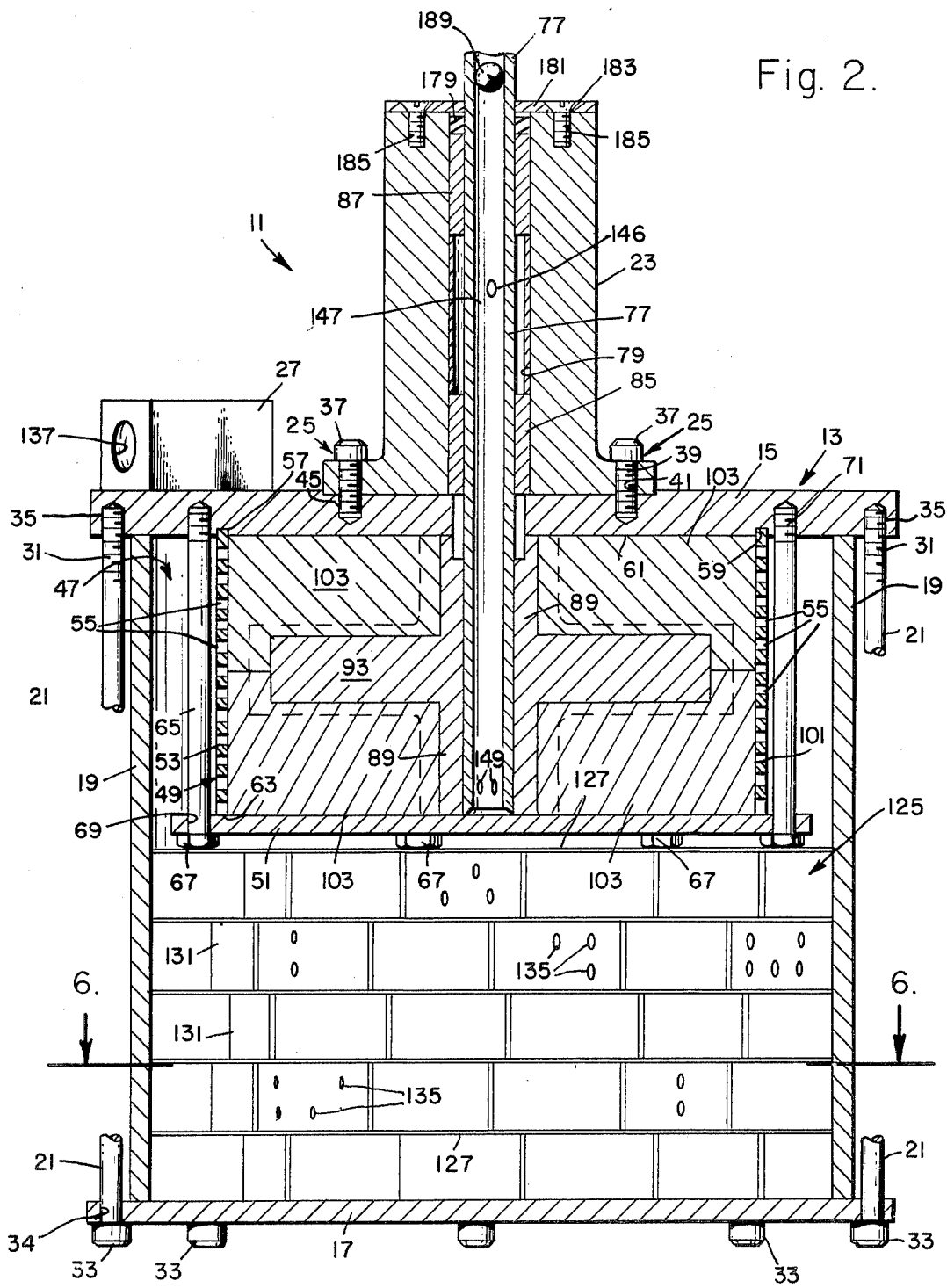
FIG. 2 is a vertical section of the embodiment of the invention shown in FIG. 1.
Figure 3:
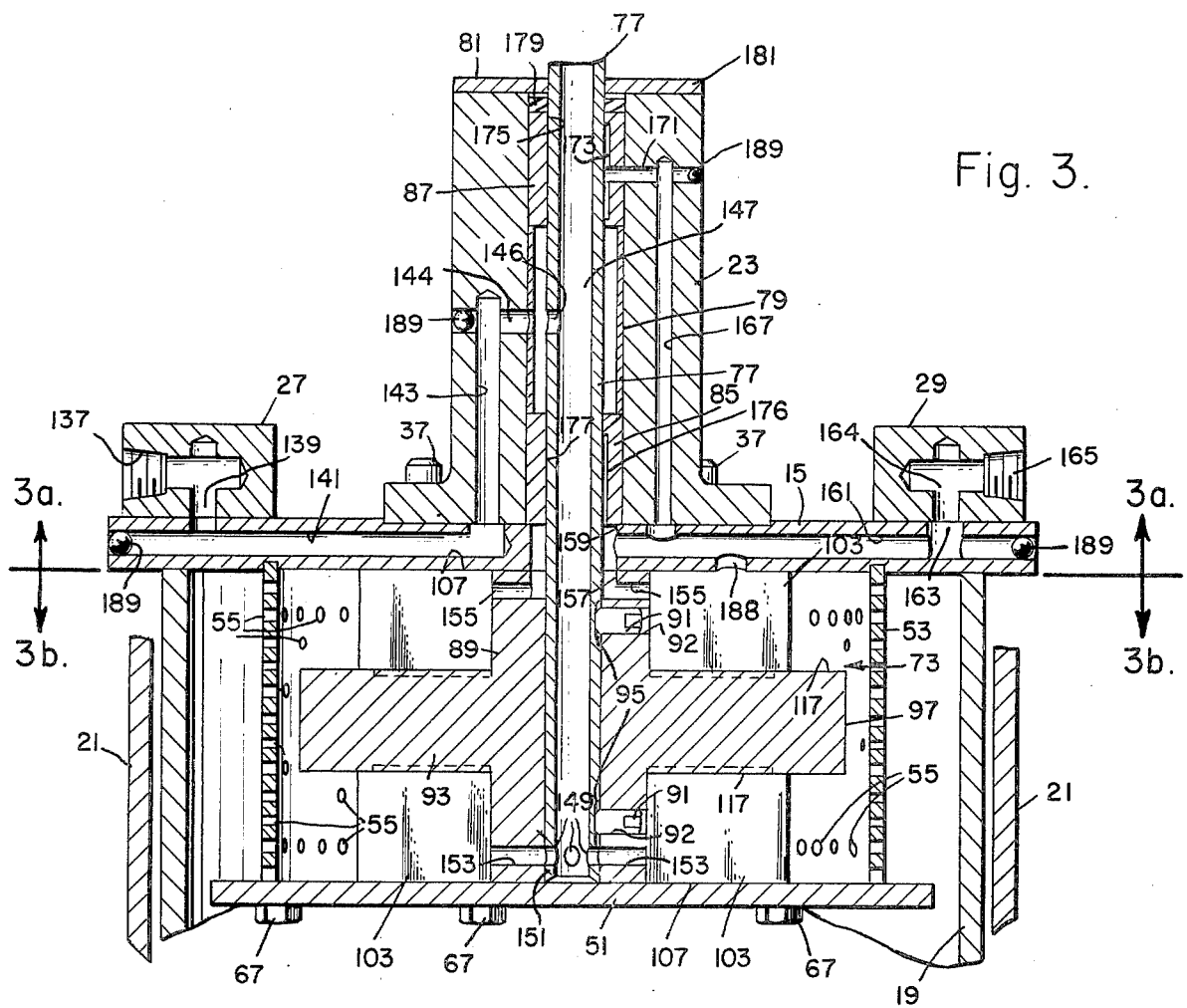
FIG. 3 is a portion of the sectional view of FIG. 2 showing the impeller rotated 45° (3a), while the upper housing is rotated 22 ½ for illustrating internal passages (3b)

Referring now to the drawings, and more particularly to FIGS. 1-3, there is shown a centrifugal cleaner 11 for removing particulate matter, or heavier unwanted liquids (acids or water), from a liquid host. The cleaner 11 includes a housing 13 with an upper plate 15, a lower plate 17 a hollow cylindrical side wall 19, elongated stud bolts 21, a bearing housing 23 mounted on the upper plate 15 by suitable screws 25, and inlet and outlet fixtures 27 and 29, respectively.

The bolts 21 have threaded ends 31, oppositely disposed heads 33 and extend through suitable holes 34 in the bottom plate 17 and are threadably engaged in threaded holes 35 in the upper plate 15. Likewise, the screws 25 have head portions 37 and their threaded shanks 39 extend through holes 41 in a flange portion 43 of the bearing housing 23 and are threadably engaged in threaded holes 45 in the upper plate 15. The upper and lower plates, the cylindrical side wall and the bearing housing may be fabricated from any suitable metal or plastic material, and by using any conventional fabrication process.

A compartment 47 is defined by the plates 15 and 17 and cylindrical side wall 19, and a cylindrical cage 49 is mounted within the compartment 47 and generally comprises a circular bottom plate 51 and a hollow cylindrical side wall 53 having a plurality of spaced apertures 55 therethrough. The upper edge 57 of the cage side wall 53 is seated in a suitably dimensioned shallow circular groove 59 in the lower surface 61 of the upper plate 15, and is held in this position by the bottom plate 51 which is in contact with the side wall's lower edge 63. Symmetrically spaced elongated threaded bolts 65, having heads 67 and extending through holes 69 in the bottom plate 51, threadably engage suitably threaded bores 71 located in the inner surface 61 of the upper plate 15 to apply the necessary pressure to maintain the position of the perforated side wall 53 under all operating conditions.

An impeller mechanism 73, affixed to an inner end portion of an elongated impeller shaft 77 and is concentrically positioned within the cage 49. The shaft 77 extends through an elongated bore 79 and beyond the outer end 81 of the bearing housing 23 for coupling by means of a pulley, for example, to a source of rotational power. The shaft 77 is maintained in axial alignment by a pair of spaced bearing structures 85 and 87 fixedly mounted within the bearing housing bore 79.

Figure 4:
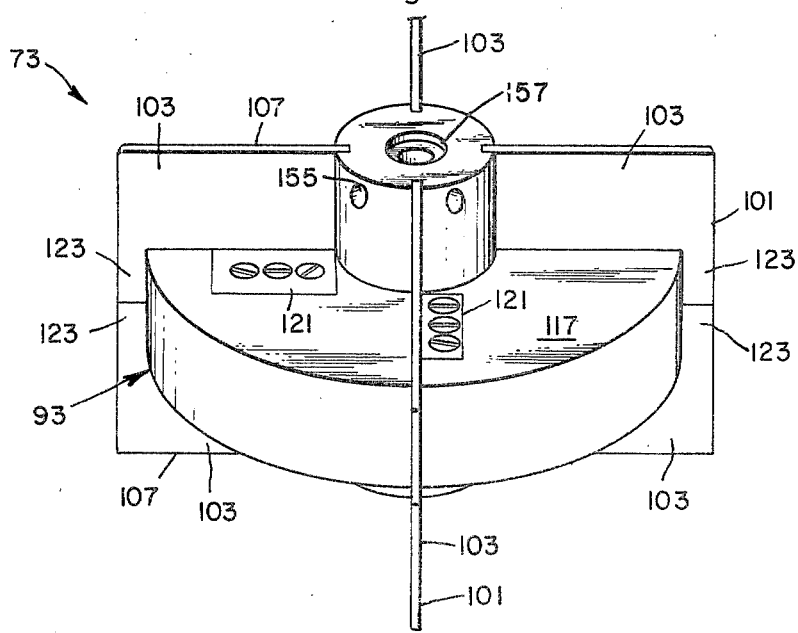
FIG. 4 is a perspective view of the impeller shown in FIG. 2.
Figure 5:
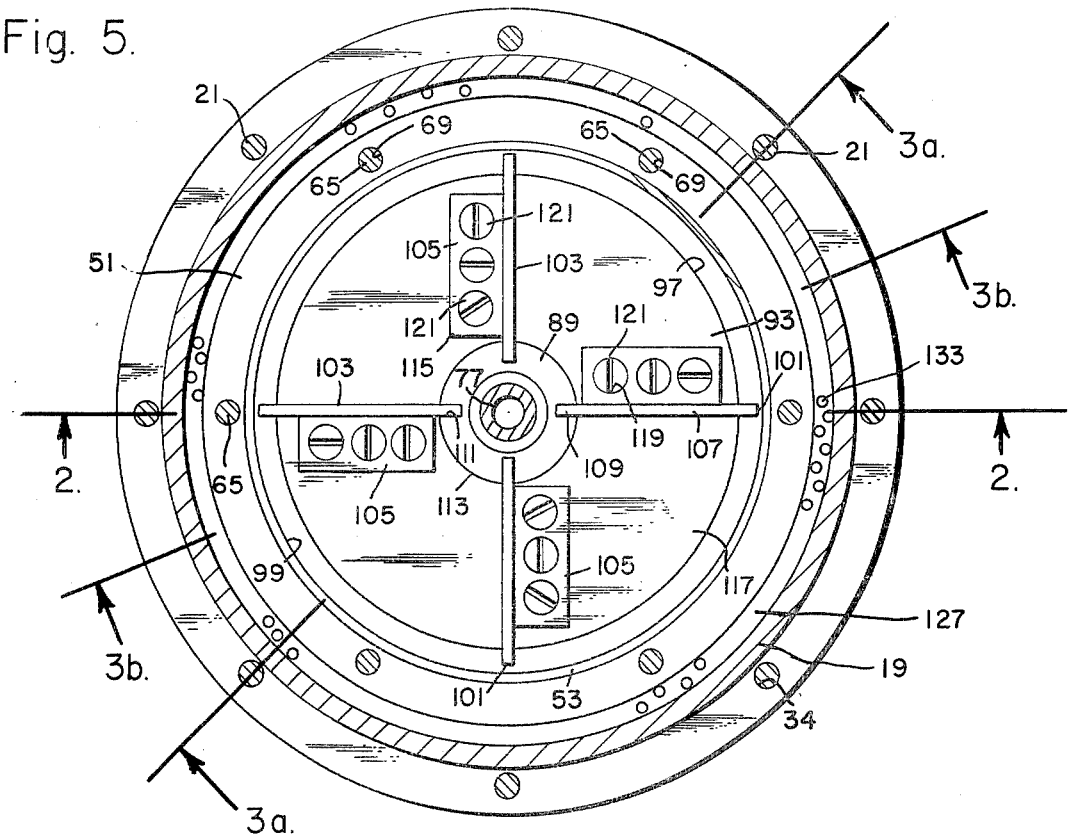
FIG. 5 is a sectional view of the embodiment of FIG. 1, taken along line 5—5.

As additionally illustrated in FIGS. 4 and 5, the impeller mechanism 73 includes a hollow body or hub portion 89 attached by set screws 91 threadably engaged in threaded holes 92 to the shaft 77, and also includes a centrally positioned transversely extending disk portion 93. Preferably, the set screws are seated in "flats" or indentations 95 in the outer surface of the shaft to prevent slippage under high pressure conditions. In accordance with this embodiment of the invention the outer edge 97 of the disk portion 93 is spaced a relatively greater distance from the interior surface 99 of the perforated side wall 53 of the cage 49, while outer edge 101 of impeller blades 103, mounted on the disk portion 93, extend to positions immediately adjacent, but not in contact with the perforated surface 99.

The impeller blades 103 include transversely extending mounting brackets 105, outer side edges 107 and inner ends 109 seated in slots 111 in the outer surface 113 of the hub portion 89. The brackets 105 are seated in appropriately dimensioned rectangular milled depressions 115 in the annular surfaces 117 of the impeller disk portion 93, and carry apertures 119 to accomodate flat head mounting screws 121, so that the outer surfaces of the brackets and the mounting screws are flush with the annular surfaces 117. It will be noted that each of the individual blades 103 include an arm portion 123 which extends along the outer edge 97 of the disk portion 93 to abut against an oppositely extending associated arm portion of a blade positioned on the opposite side of the portion 93. It will also be noted that the outer side edges 107 of the impeller blades 103 are disposed immediately adjacent to but not in contact with the inner surfaces of the associated members defining the sides of the cage 49, namely upper plate 15 and bottom plate 51.

Figure 6:
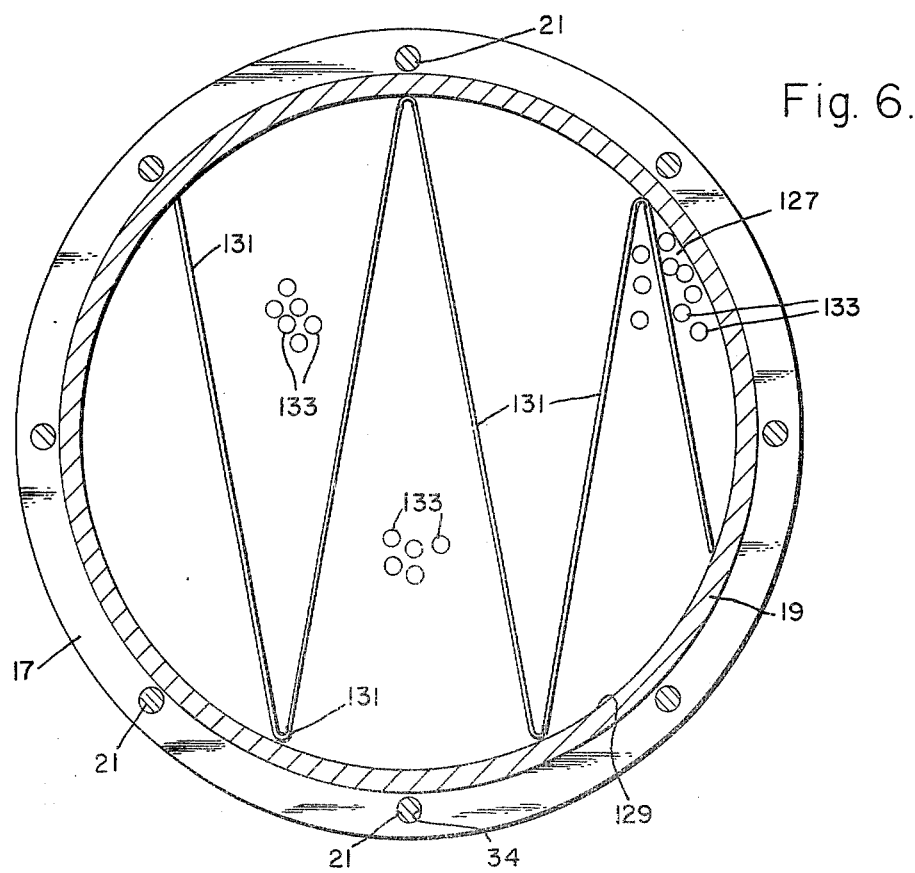
FIG. 6 is a sectional view of the embodiment of FIG. 2, taken along line 6—6.

Located below the impeller cage 49, within the compartment 47, is a stationary sedimentation section 125 including relatively thin circular disks 127 dimensioned to snugly fit within the inner cylindrical wall 129 of the side wall 19, and separated by baffle elements 131. The disks 127 are provided with relatively closely spaced holes 133 over their entire planar dimension to allow the movement of a liquid medium through all of the disks 127 in the sedimentation section 125. In accordance with the presently described embodiment, the baffle elements 131 are metal bands but in any desired form. The baffle elements 131 include holes 135 in their planar surfaces, and may be formed in a spiral, serpentine or the zig-zag pattern illustrated in FIG. 6, for example. For the sake of clarity, only a few of the holes 133 and 135 are shown.

In operation, a liquid host medium containing contaminant matter, such as particulate matter, acids, water, and/or the like, is provided under pressure to a suitably threaded inlet orifice 137 in the inlet fixture 27, the orifice communicating with an associated passage 139 in the fixture and also through an elongated passage 141 in the upper plate 15. The liquid is then conducted through an upward extending passage 143 in the bearing housing 23, through an opening 144 in the housing's inner wall 79, and through an associated opening 146 in the hollow shaft 77. The medium flows down the axially aligned shaft opening 147 and out of openings 149 in the lower portion 151 of the shaft 77, through registering holes 153 in the hub portion 89 and into the lower area of the impeller cage 49.

The fluid host medium fills the entire compartment 47 and the unwanted contaminant matter entering or located within the cage 49 is driven by centrifugal force toward the perforated side wall 53 of the cage by rotation of the shaft 77 through any suitable means such as a conventional pulley and belt or sprocket and chain drive arrangement (not shown). This force is caused by the impeller blades moving the medium located between the blades generally in a circular path about the hub 89 so that contaminant matter which is heavier than the medium itself will migrate spirally outwardly. Unwanted matter will then pass through the holes 55 in the cage wall 53 where the effects of the rotating blades are significantly reduced. At this point, the effects of gravity causes the heavier matter to move downwardly towards the stationary sedimentary section 125 at the bottom of the compartment 47.

In the presently preferred embodiment of the invention, the host medium, free of heavier contaminants, flows through radially extending bores 155 in the upper portion of the hub 89, through an annular access notch 157 leading to an annular section defined by an enlarged opening 159 in the upper plate 15. The flow path is then along an elongated outlet passage 161 in the upper plate 15, through an upper plate opening 163 and a passage 164 in the outlet fixture 29 which communciates with a threaded outlet port 165. Where the host medium is a lubricant such as oil, a vertical passage 167 is provided in the bearing housing 23 communicating with the passage 161 and with a horizontal passage section 171. Cleaned oil will then flow through these passages in the bearing housing and into an increased diameter bore section 173 in the inner bearing surface 175 of the upper bearing 87 for bearing lubrication purposes. This lubrication technique may also be applied to the lower bearing 85 as well as by means of an elongated vertical notch 176 in the inner surface 177 of the bearing leading from the enlarged opening 159 in the plate 15. A conventional seal 179 at the end of the bearing housing may be utilized and held in place by a cover plate 181 secured by screws 183 threadably engaging threaded bores 185 in the bearing housing. Of course, suitable gaskets are also provided between the upper and lower plates 15 and 17 and the cylindrical side wall 19.

In accordance with yet another embodiment of the invention, the pressure of the liquid medium leaving the system may be boosted a desired amount by simply blocking or restricting the flow of the medium through the bores 155 in the impeller hub 89 and providing an outlet opening 188 leading from the cage area 49 to the outlet passage 161 at a predetermined distance from the shaft 77. The outlet pressure will be increased as the distance increases between the shaft and the opening 188.

It should be understood that any conventional means may be used to seal the ends of the shaft bore and those of the passageways in the upper plate and bearing housing, for example, spheres 199, press fit into place, may be utilized.

From the foregoing it should be evident that there has herein been described a unique and advantageous centrifugal cleaner which is relatively simple to construct, yet is effective and highly efficient in operation. It should also be recognized that relatively little resistance to fluid flow is produced by the invention, and that contaminants are securely held in a stationary sedimentation section which can be easily cleaned from time to time. It should further be understood that although only a single impeller/cage section has been illustrated, a plurality of such stages, axially aligned, may be provided within the spirit and contemplation of the present invention.

Accordingly, it should be clear that although specific embodiments of the invention have been illustrated and described in detail, other embodiments which are obvious to those skilled in the art are within the scope of this invention. Although only certain materials have been described in implementing the various embodiments of the present invention, it should be understood that other materials having suitable qualities for a particular application may be utilized.

What is claimed is:

1. A centrifugal cleaner for removing contaminant matter from a liquid host, comprising:
   a housing having inlet and outlet openings therein and having an elongated shaft rotatably mounted and extending through a wall thereof, a portion of said shaft extending outside said housing, including means for coupling said shaft to a source of rotational power;
   an impeller structure within said housing and fixedly attached to that portion of said shaft extending within said housing, said impeller having a plurality of radially projecting blades extending an equal distance from the axis of rotation of said shaft;
   a cage enclosing said impeller and fixedly mounted within said housing, said cage having a cylindrical side wall coaxial with said axis of rotation and dimensioned such that its inner wall surface is immediately adjacent but not in contact with the outer peripheral edges of said blades, said side wall being spaced from the inner wall of said housing and including a plurality of spaced apertures therethrough, said cage including spaced transverse walls generally perpendicularly to the axis of said cylindrical side wall and having inner surfaces immediately adjacent the side edges of said blades, said cage further including inlet and outlet passages respectively providing fluid communication between said inlet and outlet openings in said housing and the interior of said cage; and
   a stationary sedimentation section disposed below said cage within said housing.

2. The centifugal cleaner according to claim 1, wherein said impeller structure includes a hollow hub portion fixedly attached to said shaft and also including a centrally-positioned transversely-extending disk portion.

3. The centrifugal cleaner according to claim 2, wherein said blades are fixedly attached to said disk portion of said impeller structure.

4. The centrifugal cleaner according to claim 3, wherein said blades are four in number, each including a transversely extending bracket portion including at least one mounting screw-accepting aperture, said bracket portions each seated in a depression in an outer annular surface of said disk portion, the outer surface of said bracket portions being flush with said outer annular surfaces.

5. The centrifugal cleaner according to claim 1, wherein said shaft includes an elongated bore providing communication between one of said inlet/outlet openings and the interior of said cage.

6. The centrifugal cleaner according to claim 5, wherein elongated bore in said shaft communicates to the interior of said cage through apertures in said impeller structure.

7. The centrifugal cleaner according to claim 1, wherein said stationary sedimentation section includes a plurality of spaced, multi-apertured, circular disks; and wherein said stationary sedimentation section also includes baffle elements sandwiched between said disks.

8. The centrifugal cleaner according to claim 1, wherein said inlet and outlet openings communicate with the interior of said cage through passageway structure terminating approximately the same distance from said axis of rotation of said shaft.

9. The centrifugal cleaner according to claim 1, wherein said outlet opening communicates with the interior of said cage through passageway structure terminating a greater distance from said axis of rotation of said shaft than does said inlet opening.

* * * * *